United States Patent
Park

(10) Patent No.: US 10,585,452 B2
(45) Date of Patent: Mar. 10, 2020

(54) TOUCH-SCREEN PANEL, RELATED ELECTRONIC DEVICE, AND RELATED MANUFACTURING METHOD

(71) Applicant: Samsung Display Co., Ltd., Yongin-si, Gyeonggi-Do (KR)

(72) Inventor: Jung-Mok Park, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 5 days.

(21) Appl. No.: 15/408,282

(22) Filed: Jan. 17, 2017

(65) Prior Publication Data

US 2017/0205850 A1 Jul. 20, 2017

(30) Foreign Application Priority Data

Jan. 18, 2016 (KR) ........................ 10-2016-0005821

(51) Int. Cl.
| | | |
|---|---|---|
| *G09G 3/30* | (2006.01) | |
| *G09G 3/36* | (2006.01) | |
| *G06F 1/16* | (2006.01) | |
| *G06F 3/044* | (2006.01) | |

(52) U.S. Cl.
CPC ............ *G06F 1/1626* (2013.01); *G06F 3/044* (2013.01); *G06F 2203/04102* (2013.01); *G06F 2203/04103* (2013.01)

(58) Field of Classification Search
CPC .................................................. G09G 2380/02
See application file for complete search history.

(56) References Cited

U.S. PATENT DOCUMENTS

| | | | |
|---|---|---|---|
| 8,436,819 B2 | 5/2013 | Huang et al. | |
| 9,467,848 B1* | 10/2016 | Song ...................... | G06F 3/0488 |
| 2014/0022202 A1* | 1/2014 | Badaye ................... | G06F 3/044 345/174 |
| 2014/0321072 A1* | 10/2014 | Cavallaro ............... | H05K 1/028 361/749 |
| 2015/0153861 A1* | 6/2015 | Yamazaki ............. | G06F 1/3265 345/173 |
| 2016/0266774 A1* | 9/2016 | Kim ...................... | G06F 3/04817 |
| 2016/0270209 A1* | 9/2016 | Cho ....................... | G06F 1/1652 |

* cited by examiner

*Primary Examiner* — Sanghyuk Park
(74) *Attorney, Agent, or Firm* — Innovation Counsel LLP

(57) ABSTRACT

A touch-screen panel may include a first touch-screen portion, a second touch-screen portion, and a third touch-screen portion. The first portion may include a first transparent electrode set. The second portion may include a second transparent electrode set, may abut the first portion at a first boundary, and may be oriented at a first angle with respect to the first portion. The third portion may include a third transparent electrode set, may abut the first portion at a second boundary, and may be oriented at a second angle with respect to the first portion. A length of the second portion in a direction parallel to the first boundary may be less than a sum of a length of the first portion in the direction parallel to the first boundary and a width of the third portion in a direction perpendicular to second boundary.

12 Claims, 9 Drawing Sheets

TOUCH-SCREEN PANEL, RELATED ELECTRONIC DEVICE, AND RELATED MANUFACTURING METHOD

CROSS-REFERENCE TO RELATED APPLICATION(S)

This application claims priority under 35 USC § 119 to Korean Patent Application No. 10-2016-0005821, filed on Jan. 18, 2016 in the Korean Intellectual Property Office (KIPO); the contents of the Korean Patent Application are incorporated herein by reference.

BACKGROUND

1. Technical Field

The technical field may be related to a touch-screen panel, a method of manufacturing the touch-screen panel, and/or an electronic device that includes the touch-screen panel.

2. Description of the Related Art

An electronic device may include a touch-screen panel for receiving user touch input. The touch-screen panel may have bent portions and may be manufactured by bending a flat touch-screen panel. The bending process may result in unwanted folds and/or unwanted cracks in the touch-screen panel.

SUMMARY

According to example embodiments, an electronic device may include a curved touch-screen panel having a shape bent with respect to a first axis and a second axis that intersects with the first axis, where an intersecting region that includes an intersection at which the first axis intersects with the second axis or that is located near the intersection is removed from the curved touch-screen panel, and a body to which the curved touch-screen panel is attached.

In example embodiments, the intersecting region may include both a portion of the first axis and a portion of the second axis.

In example embodiments, the intersecting region may include either a portion of the first axis or a portion of the second axis.

In example embodiments, the intersecting region may include no portion of the first axis and no portion of the second axis.

In example embodiments, the curved touch-screen panel may be divided into a center remaining region and an outer remaining region by the first axis and the second axis, and a transparent electrode pattern of the center remaining region is identical to a transparent electrode pattern of the outer remaining region.

In example embodiments, the center remaining region may include N transparent electrode pattern lines, where N is an integer greater than or equal to 1, and the outer remaining region may include M transparent electrode pattern lines, where M is an integer greater than or equal to 1.

In example embodiments, an electrode pitch of the center remaining region may be equal to an electrode pitch of the outer remaining region.

In example embodiments, the curved touch-screen panel may be divided into a center remaining region and an outer remaining region by the first axis and the second axis, and a transparent electrode pattern/shape of the center remaining region may be different from a transparent electrode pattern/shape of the outer remaining region.

In example embodiments, the center remaining region may include N transparent electrode pattern lines, where N is an integer greater than or equal to 1, and the outer remaining region may include M transparent electrode pattern lines, where M is an integer greater than or equal to 1.

In example embodiments, an electrode pitch of the center remaining region may be equal to an electrode pitch of the outer remaining region.

In example embodiments, an electrode pitch of the center remaining region may be unequal to an electrode pitch of the outer remaining region.

In example embodiments, the curved touch-screen panel may include a first transparent electrode layer having a structure in which first transparent electrode patterns are connected in a first direction and a second transparent electrode layer having a structure in which second transparent electrode patterns are connected in a second direction that is perpendicular to the first direction.

In example embodiments, the curved touch-screen panel may include a single transparent electrode layer having a structure in which first transparent electrode patterns are connected in a first direction and second transparent electrode patterns are connected using bridges in a second direction that is perpendicular to the first direction.

In example embodiments, the electronic device may further include a curved display panel combined with the curved touch-screen panel, where the curved display panel is manufactured to have a shape that is substantially identical to the shape of the curved touch-screen panel.

According to example embodiments, a method of manufacturing a curved touch-screen panel may include the following steps: a step of preparing a flat touch-screen panel, a step of determining a first axis and a second axis that intersects with the first axis based on a target shape of the curved touch-screen panel, a step of removing an intersecting region that includes an intersection at which the first axis intersects with the second axis or that is located near the intersection from the flat touch-screen panel, and a step of bending the flat touch-screen panel with respect to the first axis and the second axis to form the target shape of the curved touch-screen panel.

In example embodiments, the intersecting region may include both a portion of the first axis and a portion of the second axis.

In example embodiments, the intersecting region may include either a portion of the first axis or a portion of the second axis.

In example embodiments, the intersecting region may include no portion of the first axis and no portion of the second axis.

In example embodiments, the flat touch-screen panel may include a first transparent electrode layer having a structure in which first transparent electrode patterns are connected in a first direction and a second transparent electrode layer having a structure in which second transparent electrode patterns are connected in a second direction that is perpendicular to the first direction.

In example embodiments, the flat touch-screen panel may include a single transparent electrode layer having a structure in which first transparent electrode patterns are connected in a first direction and second transparent electrode patterns are connected using bridges in a second direction that is perpendicular to the first direction.

Example embodiments may be related to a touch-screen panel. The touch-screen panel may include a first touch-screen portion, a second touch-screen portion, and a third touch-screen portion. The first touch-screen portion may include a first transparent electrode set. The second touch-screen portion may include a second transparent electrode set, may be directly connected to (or abut) the first touch-screen portion at a first boundary (or a first edge of the first touch-screen portion), and may be oriented at a first angle with respect to the first touch-screen portion. The third touch-screen portion may include a third transparent electrode set, may be directly connected to (or abut) the first touch-screen portion at a second boundary (or a second edge of the first touch-screen portion), and may be oriented at a second angle with respect to the first touch-screen portion. The second boundary may not be parallel to the first boundary. A minimum length of the second touch-screen portion in a direction parallel to the first boundary may be less than a sum of a minimum length of the first touch-screen portion in the direction parallel to the first boundary and a minimum width of the third touch-screen portion in a direction perpendicular to second boundary.

The first angle may be greater than 0 degree and less than 180 degrees. The second angle may be greater than 0 degree and less than 180 degrees.

The first angle may be a first obtuse angle. The second angle may be a second obtuse angle.

A thickness of the first touch-screen portion, a thickness of the second touch-screen portion, and a thickness of the third touch-screen portion may be equal to one another.

Every two of the first touch-screen portion, the second touch-screen portion, and the third touch-screen portion may be non-coplanar.

A maximum length of the second touch-screen portion in the direction parallel to the first boundary may be less than a sum of a maximum length of the first touch-screen portion in the direction parallel to the first boundary and a maximum width of the third touch-screen portion in the direction perpendicular to second boundary.

A minimum length of the second touch-screen portion in the direction parallel to the first boundary may be less than a minimum length of the first touch-screen portion in the direction parallel to the first boundary.

A maximum length of the second touch-screen portion in the direction parallel to the first boundary may be less than a maximum length of the first touch-screen portion in the direction parallel to the first boundary.

The first boundary may be positioned between two opposite edges of the third touch-screen portion.

A first edge of the third touch-screen portion may be positioned between the first boundary and a second edge of the third touch-screen portion.

Each of a first edge of the second touch-screen portion and a second edge of the second touch-screen portion may extend not parallel to the first boundary. The first edge of the second touch-screen portion may be longer than the second edge of the second touch-screen portion.

Each of a first edge of the third touch-screen portion and a second edge of the third touch-screen portion may extend not parallel to the second boundary. The first edge of the third touch-screen portion may be longer than the second edge of the third touch-screen portion.

Each of a first edge of the second touch-screen portion and a second edge of the second touch-screen portion may extend parallel to the first boundary. The first edge of the second touch-screen portion may be longer than the second edge of the second touch-screen portion.

A shape of an electrode in the second transparent electrode set may be different from a shape of an electrode or each electrode in the third transparent electrode set.

Shapes of electrodes in the second transparent electrode set may be different from shapes of electrodes or all electrodes in the first transparent electrode set.

A size of an electrode in the second transparent electrode set may be unequal to a size of each electrode in the third transparent electrode set.

A shape of an electrode in the second transparent electrode set may be different from a shape of an electrode or each electrode in the first transparent electrode set.

A size of an electrode in the second transparent electrode set may be unequal to a size of each electrode in the first transparent electrode set.

The touch-screen panel may include a fourth touch-screen portion. The first touch-screen portion may be positioned between the second touch-screen portion and the fourth touch-screen portion. The fourth touch-screen portion may include a fourth transparent electrode set, may be directly connected to the first touch-screen portion at a third boundary, and may be oriented at a third angle with respect to the first touch-screen portion. The third boundary may be parallel to the first boundary. A minimum length of the fourth touch-screen portion in the direction parallel to the first boundary may be less than the sum of the minimum length of the first touch-screen portion in the direction parallel to the first boundary and the minimum width of the third touch-screen portion in a direction perpendicular to second boundary. The minimum length of the second touch-screen portion in the direction parallel to the first boundary may be less than the minimum length of the fourth touch-screen portion in the direction parallel to the first boundary.

A thickness of the fourth touch-screen portion may be equal to a thickness of the first touch-screen portion.

The fourth touch-screen portion and the first touch-screen portion may not be coplanar.

A maximum length of the second touch-screen portion in the direction parallel to the first boundary may be unequal to a maximum length of the fourth touch-screen portion in the direction parallel to the first boundary.

Example embodiments may be related to a method for manufacturing a touch-screen panel. The method may include preparing a panel that may include a first touch-screen portion, a second touch-screen portion, a third touch-screen portion, and a abutting portion. The first touch-screen portion may include a first transparent electrode set. The second touch-screen portion may include a second transparent electrode set and may be directly connected to the first touch-screen portion at a first boundary. The third touch-screen portion may include a third transparent electrode set and may be directly connected to the first touch-screen portion at a second boundary. The second boundary may be not parallel to the first boundary. The abutting portion may abut at least one of the second touch-screen portion and the third touch-screen portion. The method may include removing the abutting portion to form a remaining panel. The method may include, after the abutting portion has been removed, bending the remaining panel at the first boundary such that the second touch-screen portion may become oriented at a first angle with respect to the first touch-screen portion, and bending the remaining panel at the second boundary such that the third touch-screen portion may become oriented at a second angle with respect to the first touch-screen portion.

The method may include determining at least one of (e.g., a positon and/or a dimension of) the first boundary and (e.g., a position and/or a dimension of) the second boundary based on a target configuration (e.g., a target shape) of the touch-screen panel.

The first boundary may be positioned between two opposite edges of the abutting portion before removal of the abutting portion.

A first edge of the abutting portion may be positioned between the first boundary and a second edge of the abutting portion before removal of the abutting portion.

Example embodiments may be related to an electronic device that includes at least one of the above-described elements and/or is manufactured using at least one of the above-described steps.

An electronic device according to example embodiments may include a curved/bent touch-screen panel having non-coplanar touch-screen portions bent with respect to a plurality of axes. The curved/bent touch-screen panel may have substantially no unwanted folds or unwanted cracks.

In embodiments, a method of manufacturing a curved/bent touch-screen panel may enable the curved touch-screen panel to have non-coplanar touch-screen portions bent with respect to a plurality of axes without or with minimum unwanted folds or unwanted cracks.

DETAILED DESCRIPTION OF THE EMBODIMENTS

Embodiments are described with reference to the accompanying drawings.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively. An "axis" may be a "geometric line" and/or "boundary". The term "curved" may mean "bent". The term "pattern" may mean "shape".

Figure 1:
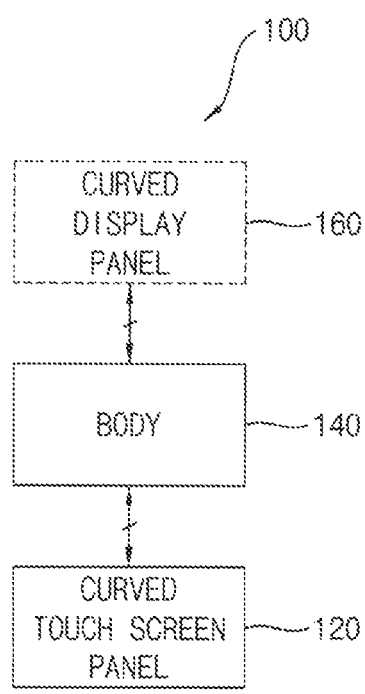
FIG. 1 is a block diagram illustrating an electronic device according to example embodiments.
Figure 2:
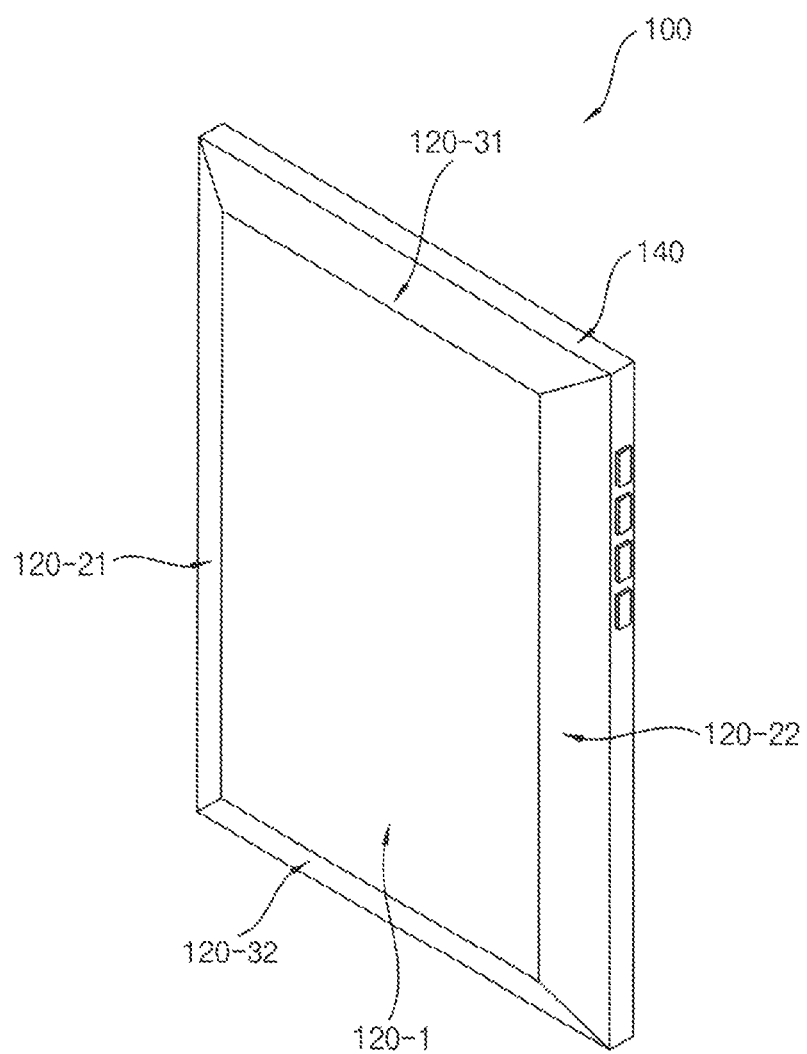
FIG. 2 is a perspective view illustrating an electronic device (e.g., a smart phone) according to example embodiments.
Figure 3:
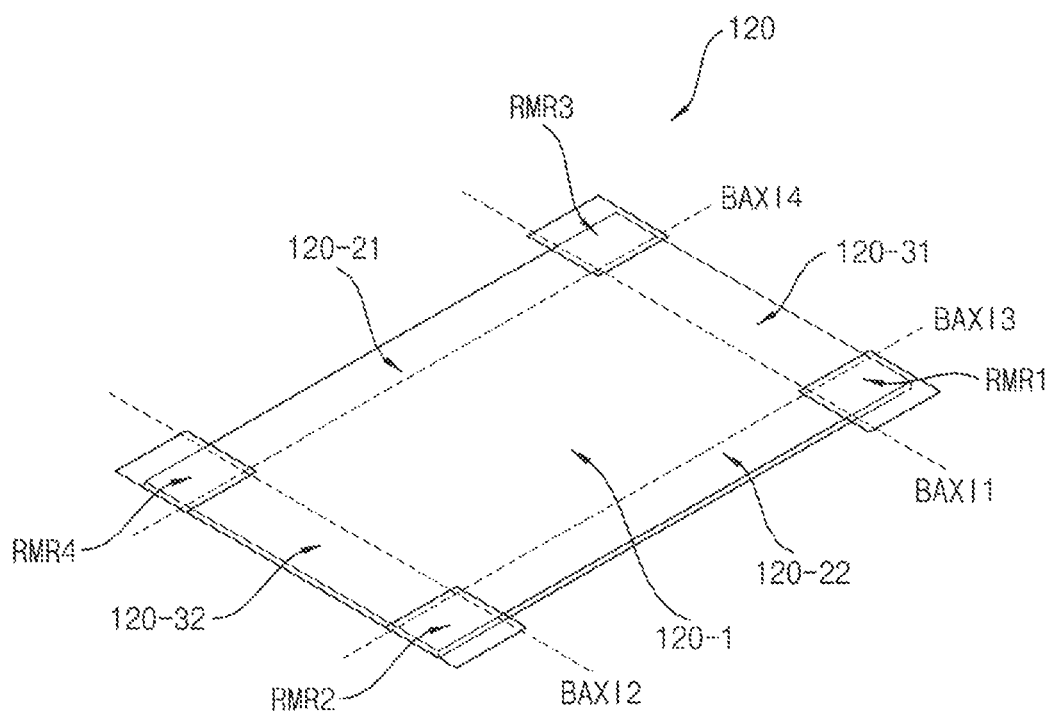
FIG. 3 is a diagram illustrating an example of a panel prepared for manufacturing a curved touch-screen panel included in an electronic device according to example embodiments.
Figure 4:
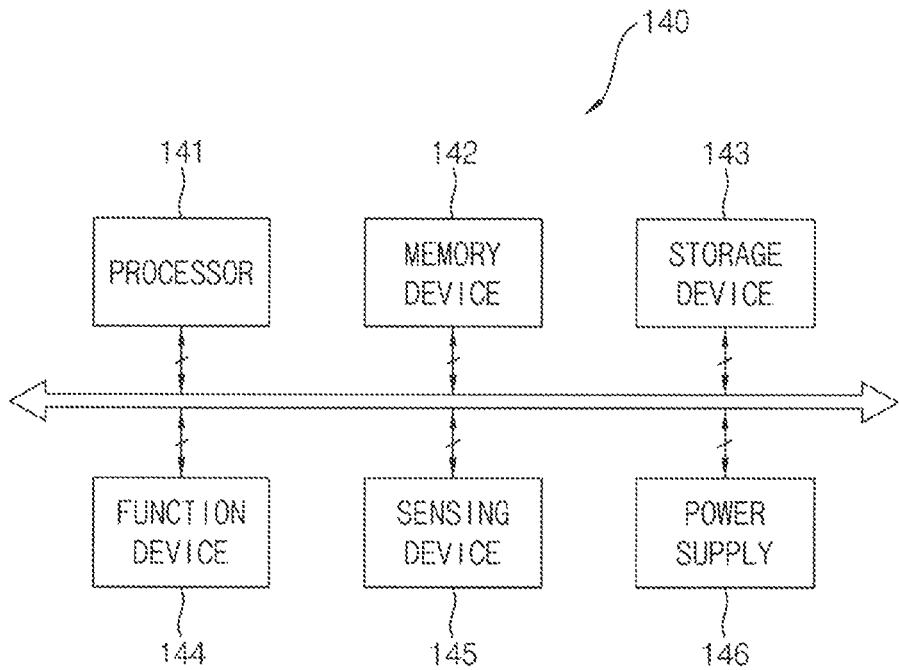
FIG. 4 is a block diagram illustrating an example of a body included in an electronic device according to example embodiments.

FIG. 1 is a block diagram illustrating an electronic device according to example embodiments. FIG. 2 is a perspective view illustrating the electronic device (e.g., a smart phone) according to example embodiments. FIG. 3 is a diagram illustrating an example of a prepared panel for manufacturing a curved touch-screen panel included in the electronic device according to example embodiments. FIG. 4 is a block diagram illustrating an example of a body included in the electronic device according to example embodiments.

Referring to FIGS. 1 through 4, the electronic device 100 may include a curved touch-screen panel 120 and a body 140 to which the curved touch-screen panel 120 is attached and/or electrically connected. In some example embodiments, the electronic device 100 may further include a curved display panel 160 combined with the curved touch-screen panel 120, where the curved display panel 120 is manufactured to have a shape that is substantially identical to a shape of the curved touch-screen panel 120. In an example embodiment, the electronic device 100 may be a smart phone. However, the electronic device 100 is not limited thereto. For example, the electronic device 100 may be/include one of a cellular phone, a video phone, a smart pad, a smart watch, a tablet PC, a car navigation system, a television, a computer monitor, a laptop, a head mounted display (HMD) device, etc.

The curved touch-screen panel 120 may have a shape bent with respect to a first axis and a second axis that intersects with the first axis. Here, an intersecting region that includes an intersection at which the first axis intersects with the second axis or that is located near the intersection may be removed from the curved touch-screen panel 120. In an example embodiment, the intersecting region may include both a portion of the first axis and a portion of the second axis. In an example embodiment, the intersecting region may include either a portion of the first axis or a portion of the second axis. In an example embodiment, the intersecting region may include no portion of the first axis and no portion of the second axis. Example embodiments are further described with reference to FIGS. 5 and 6. Referring to FIG. 3, the curved touch-screen panel 120 may have a shape bent with respect to four axes, namely a first horizontal (i.e., left and right) axis BAXI1, a second horizontal axis BAXI2, a first vertical (i.e., top and bottom) axis BAXI3, and a second vertical axis BAXI4. In embodiments, the first horizontal axis BAXI1 may intersect with the first vertical axis BAXI3, the first horizontal axis BAXI1 may intersect with the second vertical axis BAXI4, the second horizontal axis BAXI2 may intersect with the first vertical axis BAXI3, and the second horizontal axis BAXI2 may intersect with the second vertical axis BAXI4. In embodiments, a first intersecting region RMR1 that includes the intersection of the first horizontal axis BAXI1 and the first vertical axis BAXI3 or that is located near the intersection of the first horizontal axis BAXI1 and the first vertical axis BAXI3 may be removed from a flat touch-screen panel (i.e., the curved touch-screen panel 120). In embodiments, a second intersecting region RMR2 that includes the intersection of the second horizontal axis BAXI2 and the first vertical axis BAXI3 or that is located near the intersection of the second horizontal axis BAXI2 and the first vertical axis BAXI3 may be removed from the curved touch-screen panel 120. In embodiments, a third intersecting region RMR3 that includes the intersection of the first horizontal axis BAXI1 and the second vertical axis BAXI4 or that is located near the intersection of the first horizontal axis BAXI1 and the second vertical axis BAXI4 may be removed from the curved touch-screen panel 120. In embodiments, a fourth intersecting region RMR4 that includes the intersection of the second horizontal axis BAXI2 and the second vertical axis BAXI4 or that is located near the intersection of the second horizontal axis BAXI2 and the second vertical axis BAXI4 may be removed from the curved touch-screen panel 120. Referring to FIGS. 2 and 3, the curved touch-screen panel 120 may be divided into a center remaining region 120-1 and outer remaining regions 120-21, 120-22, 120-31, and 120-32 by the first horizontal axis BAXI1, the second horizontal axis BAXI2, the first vertical axis BAXI3, and the second vertical axis BAXI4.

In embodiments, the curved touch-screen panel 120 may be manufactured by bending the flat touch-screen panel at or with respect to the first axis and the second axis. In embodiments, since the intersecting regions are removed from the flat touch-screen panel, the curved touch-screen panel 120 may be manufactured substantially without unwanted folds and/or unwanted cracks. Referring to FIGS. 2 and 3, since the intersecting regions RMR1, RMR2, RMR3, and RMR4 are removed from the flat touch-screen panel (i.e., the curved touch-screen panel 120), unwanted folds and/or unwanted cracks that can be occur near the intersections of the first horizontal axis BAXI1, the second horizontal axis BAXI2, the first vertical axis BAXI3, and the second vertical axis BAXI4 may be prevented or minimized when the curved touch-screen panel 120 is manufactured. In an example embodiment, the curved touch-screen panel 120 may include a first transparent electrode layer having first transparent electrode patterns connected in a first direction and may include a second transparent electrode layer having second transparent electrode patterns connected in a second direction perpendicular to the first direction. In embodiments, the first transparent electrode layer overlaps the second transparent electrode layer. Portions of transparent electrode layers that correspond to the intersecting regions may be removed. In an example embodiment, the curved touch-screen panel 120 may include a single transparent electrode layer having first transparent electrode patterns connected in a first direction (e.g., an X-axis direction) and having second transparent electrode patterns connected using bridges in a second direction (e.g., a Y-axis direction) perpendicular to the first direction.

In an example embodiment, the curved touch-screen panel 120 may be divided into the center remaining region and the outer remaining region by the first axis and the second axis, and a transparent electrode pattern/shape/size of the center remaining region may be identical and/or equal to a transparent electrode pattern/shape/size of the outer remaining region. For example, the transparent electrode shape/pattern of the center remaining region of the curved touch-screen panel 120 may be a triangle shape/pattern (and may include a diamond shape/pattern when two transparent electrode shapes/patterns are combined), and the transparent electrode pattern of the outer remaining region of the curved touch-screen panel 120 may also be the triangle shape pattern. In FIGS. 2 and 3, the transparent electrode pattern of the center remaining region 120-1 may be identical to respective transparent electrode patterns of the outer remaining regions 120-21, 120-22, 120-31, and 120-32. In embodiments, the center remaining region 120-1 may include N transparent electrode pattern lines, where N is an integer greater than or equal to 1, and each of the outer remaining regions 120-21, 120-22, 120-31, and 120-32 may include M transparent electrode pattern lines, where M is an integer greater than or equal to 1. In embodiments, an electrode pitch of the center remaining region 120-1 may be the same as respective electrode pitches of the outer remaining regions 120-21, 120-22, 120-31, and 120-32. In an example embodiment, the curved touch-screen panel 120 may be divided into the center remaining region and the outer remaining region by the first axis and the second axis, and a transparent electrode pattern of the center remaining region may be different from a transparent electrode pattern of the outer remaining region. For example, the transparent electrode pattern of the center remaining region of the curved touch-screen panel 120 may be a triangle shape pattern (and may include a diamond shape pattern when two transparent electrode patterns are combined), and the transparent electrode pattern of the outer remaining region of the curved touch-screen panel 120 may be a rectangular shape pattern. In FIGS. 2 and 3, the transparent electrode pattern of the center remaining region 120-1 may be different from respective transparent electrode patterns of the outer remaining regions 120-21, 120-22, 120-31, and 120-32. In embodiments, the center remaining region 120-1 may include N transparent electrode pattern lines, and each of the outer remaining regions 120-21, 120-22, 120-31, and 120-32 may include M transparent electrode pattern lines. In embodiments, an electrode pitch of the center remaining region 120-1 may be equal or unequal to respective electrode pitches of the outer remaining regions 120-21, 120-22, 120-31, and 120-32. In embodiments, it is required to prevent sensing errors from occurring in the center remaining region 120-1 and the outer remaining regions 120-21, 120-22, 120-31, and 120-32. In embodiments, to make the center remaining region 120-1 and each of the outer remaining regions 120-21, 120-22, 120-31, and 120-32 include a complete shaped transparent electrode pattern, a pitch design of the transparent electrode pattern may be performed by considering that the intersecting regions RMR1, RMR2, RMR3, and RMR4 corresponding to the intersections of the first horizontal axis BAXI1, the second horizontal axis BAXI2, the first vertical axis BAXI3, and the second vertical axis BAXI4 are removed from the curved touch-screen panel 120.

The curved touch-screen panel 120 may be attached to and/or electrically connected to the body 140. In some example embodiments, the curved display panel 160 may also be attached to and/or electrically connected to the body 140. In embodiments, the curved display panel 160 may be manufactured to have a shape that is substantially identical to and/or consistent with the shape of the curved touch-screen panel 120, and thus the curved display panel 160 may be combined with the curved touch-screen panel 120. For example, the curved display panel 160 may be an organic light emitting display (OLED) panel or a liquid crystal display (LCD) panel. However, the curved display panel 160 is not limited thereto. Since the curved touch-screen panel 120 and the curved display panel 160 are attached to the body 140, the body 140 may include a controller (i.e., a touch-screen panel controller and a display panel controller). In embodiments, the controller may control a touch sensor function of the curved touch-screen panel 120 and a display function of the curved display panel 160. In embodiments, as illustrated in FIG. 4, the body 140 may include a processor 141, a memory device 142, a storage device 143, a function device 144, a sensing device 145, and a power supply 146. Specifically, the processor 141 may perform various computing functions to control operations of the electronic device 100. For example, the processor 141 may include an application processor (AP), a microprocessor, a central processing unit (CPU), etc. The memory device 142 may store data for the operations of the electronic device 100. For example, the memory device 142 may include a volatile semiconductor memory device such as a dynamic random access memory (DRAM) device, a static random access memory (SRAM) device, a mobile DRAM device, etc., and/or a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano-floating gate memory (NFGM) device, a polymer random access memory (PoRAM) device, a magnetic random access memory (MRAM) device, a ferroelectric random access memory (FRAM) device, etc. The storage device 143 may include a solid state drive (SSD) device, a hard disk drive (HDD) device, a CD-ROM device, etc. The function device 144 may perform various functions of the electronic device 100. For example, the function device 144 may include a camera device that performs a camera function, a communication device that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for microwave access (WIMAX) module, etc.), a global positioning system (GPS) device, a microphone (MIC) device, a speaker device, etc. The sensing device 145 may perform various sensing functions of the electronic device 100. For example, the sensing device 145 may include a gyro sensor that measures a rotating angular speed, an acceleration sensor that measures a speed and a momentum, a geomagnetic field sensor that acts as a compass, a barometer sensor that measures an altitude, a gesture-proximity-illumination sensor that performs various operations such as a motion recognition, a proximity detection, a illumination measurement, etc., a temperature-humidity sensor that measures a temperature and a humidity, and a grip sensor that determines whether the electronic device 100 is gripped by a user, etc. The power supply 146 may provide power for the operations of the electronic device 100. For example, the power supply 146 may include a battery.

In embodiments, the electronic device 100 may have non-coplanar touch-screen portions of the curved touch-screen panel 120 bent with respect to a plurality of axes, where the curved touch-screen panel 120 can be manufactured substantially without unwanted folds and/or cracks. In embodiments, when a pressure is continuously applied to the curved touch-screen panel 120 as a user uses the electronic device 100, the pressure may be effectively dispersed. Thus, undesirable cracks potentially caused by the pressure may be effectively prevented or minimized. As a result, the electronic device 100 may have satisfactory durability. In some example embodiments, the electronic device 100 may further include other components such as the curved display panel 160.

Figure 5:
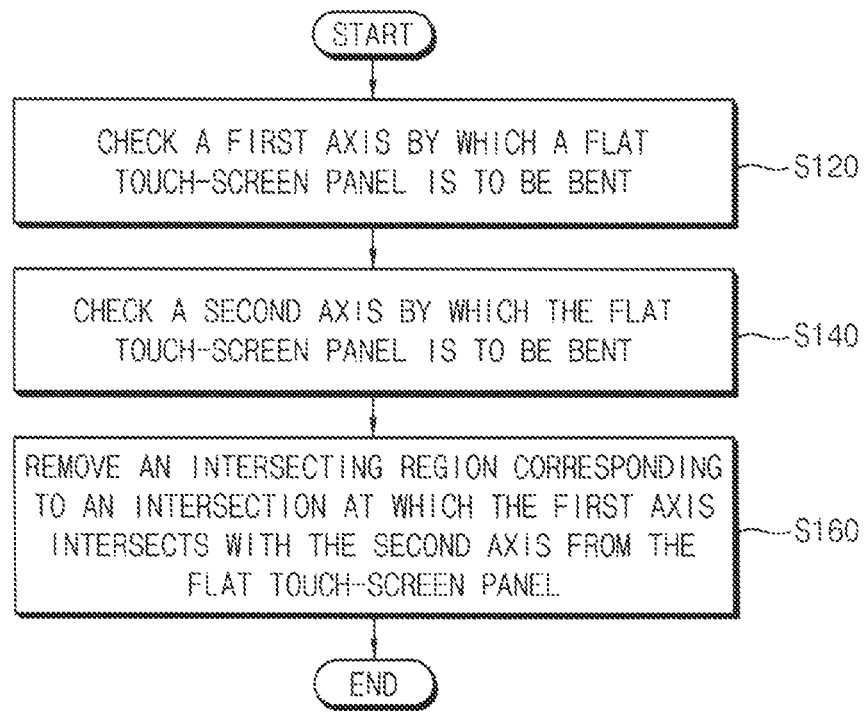
FIG. 5 is a flowchart illustrating a process of manufacturing a curved/bent touch-screen panel to be included in an electronic device according to example embodiments.
Figure 6:
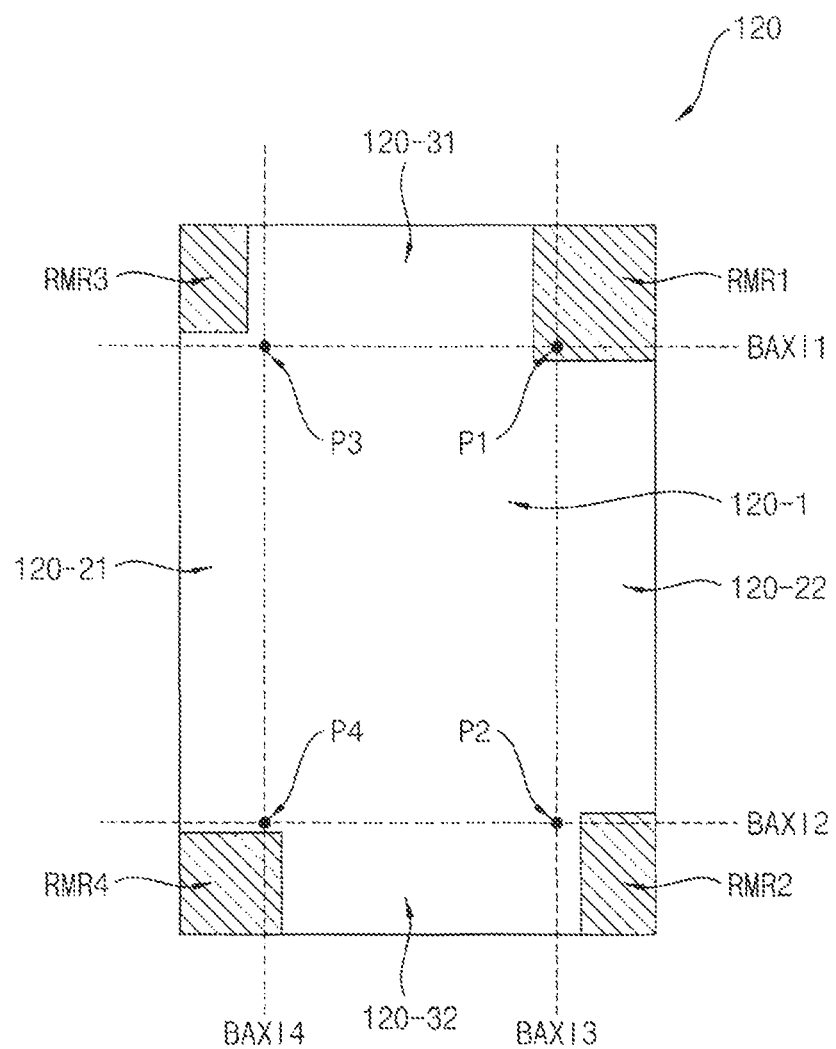
FIG. 6 is a diagram illustrating an example in which intersecting regions (or abutting portions) are removed for manufacturing a curved/bent touch-screen panel according to example embodiments.

FIG. 5 is a flowchart illustrating a process of manufacturing a curved touch-screen panel to be included in an electronic device according to example embodiments. FIG. 6 is a diagram illustrating an example in which intersecting regions (or abutting portions) are removed for manufacturing a curved touch-screen panel according to example embodiments.

Referring to FIGS. 5 and 6, a method for manufacturing the curved touch-screen panel 120 may include the following steps: checking a first axis by which a flat touch-screen panel is to be bent (S120), checking a second axis by which the flat touch-screen panel is to be bent (S140), and removing an intersecting region corresponding to an intersection at which the first axis intersects with the second axis from the flat touch-screen panel (S160), where the first axis is perpendicular to the second axis.

In embodiments, referring to FIG. 6, the curved touch-screen panel 120 may have a shape bent with respect to four axes, namely a first horizontal (i.e., left and right) axis BAXI1, a second horizontal axis BAXI2, a first vertical (i.e., top and bottom) axis BAXI3, and a second vertical axis BAXI4. In embodiments, the first horizontal axis BAXI1 may intersect with the first vertical axis BAXI3, the first horizontal axis BAXI1 may intersect with the second vertical axis BAXI4, the second horizontal axis BAXI2 may intersect with the first vertical axis BAXI3, and the second horizontal axis BAXI2 may intersect with the second vertical axis BAXI4. Thus, intersecting regions RMR1, RMR2, RMR3, and RMR4 that include intersections P1, P2, P3, and P4 of the first horizontal axis BAXI1, the second horizontal axis BAXI2, the first vertical axis BAXI3, and the second vertical axis BAXI4 or that are located near the intersections P1, P2, P3, and P4 may be removed from the flat touch-screen panel (i.e., the curved touch-screen panel 120). It is illustrated in FIG. 6 that the first intersecting region RMR1 that includes the intersection P1 of the first horizontal axis BAXI1 and the first vertical axis BAXI3 is removed, the second intersecting region RMR2 that is located near the intersection P2 of the second horizontal axis BAXI2 and the first vertical axis BAXI3 is removed, the third intersecting region RMR3 that is located near the intersection P3 of the first horizontal axis BAXI1 and the second vertical axis BAXI4 is removed, and the fourth intersecting region RMR4 that is located near the intersection P4 of the second horizontal axis BAXI2 and the second vertical axis BAXI4 is removed. As a result, referring to FIG. 6, the curved touch-screen panel 120 may be divided into a center remaining region 120-1 and outer remaining regions 120-21, 120-22, 120-31, and 120-32 by the first horizontal axis BAXI1, the second horizontal axis BAXI2, the first vertical axis BAXI3, and the second vertical axis BAXI4. In an example embodiment, the intersecting region may include both a portion of the first axis and a portion of the second axis. For example, it is illustrated in FIG. 6 that the first intersecting region RMR1 includes a portion of the first axis (e.g., the first horizontal axis BAXI1) and a portion of the second axis (e.g., the first vertical axis BAXI3). In an example embodiment, the intersecting region may include either a portion of the first axis or a portion of the second axis. For example, it is illustrated in FIG. 6 that the second intersecting region RMR2 includes only a portion of the first axis (e.g., the second horizontal axis BAXI2) and the fourth intersecting region RMR4 includes only a portion of the second axis (e.g., the second vertical axis BAXI4). In an example embodiment, the intersecting region may include no portion of the first axis and no portion of the second axis. For example, it is illustrated in FIG. 6 that the third intersecting region RMR3 includes no portion of the first axis (e.g., the first horizontal axis BAXI1) and no portion of the second axis (e.g., the first vertical axis BAXI3).

In embodiments, the curved touch-screen panel 120 may be manufactured by bending the remaining flat touch-screen panel with respect to the first axis and the second axis. In embodiments, since the intersecting regions are removed from the flat touch-screen panel, the curved touch-screen panel 120 may be manufactured substantially without unwanted folds and/or unwanted cracks. In embodiments, referring to FIG. 6, since the intersecting regions RMR1, RMR2, RMR3, and RMR4 that include/near the intersections P1, P2, P3, and P4 of the first horizontal axis BAXI1, the second horizontal axis BAXI2, the first vertical axis BAXI3, and the second vertical axis BAXI4 or that are located near the intersections P1, P2, P3, and P4 of the first horizontal axis BAXI1, the second horizontal axis BAXI2, the first vertical axis BAXI3, and the second vertical axis BAXI4 are removed from the flat touch-screen panel (i.e., the curved touch-screen panel 120), unwanted folds and/or unwanted cracks that can potentially occur near the intersections P1, P2, P3, and P4 of the first horizontal axis BAXI1, the second horizontal axis BAXI2, the first vertical axis BAXI3, and the second vertical axis BAXI4 may be prevented when the curved touch-screen panel 120 is manufactured (e.g., when the remaining flat touch-screen panel is bent with respect to or at the first horizontal axis BAXI1, the second horizontal axis BAXI2, the first vertical axis BAXI3, and the second vertical axis BAXI4. Although it is illustrated in FIG. 6 that the first axis by which the flat touch-screen panel is bent to form a shape of the curved touch-screen panel 120 includes two horizontal axes of the curved touch-screen panel 120 (i.e., the first horizontal axis BAXI1 and the second horizontal axis BAXI2) and the second axis by which the flat touch-screen panel is bent to form the shape of the curved touch-screen panel 120 includes two vertical axes (i.e., the first vertical axis BAXI3 and the second vertical axis BAXI4), bending axes of the remaining flat touch-screen panel are not limited thereto. For example, the axes by which the remaining flat touch-screen panel is bent may include an extending in a first diagonal direction of the curved touch-screen panel 120, an axis extending in a second diagonal direction of the curved touch-screen panel 120, and/or an axis extending not parallel to any edge of the remaining flat touch-screen panel.

Figure 7A:
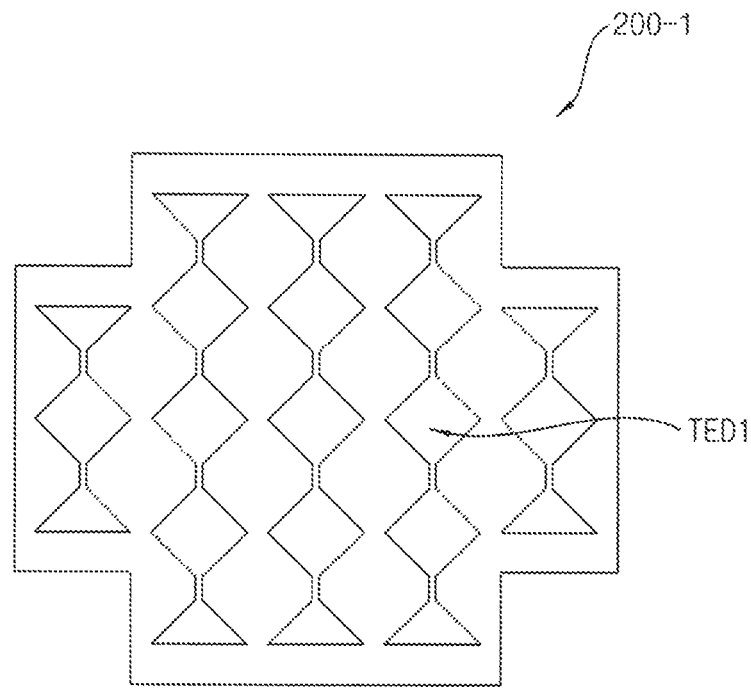
FIG. 7A and FIG. 7B are diagrams illustrating transparent electrode layers of a panel (partially-removed panel or remaining panel) prepared for manufacturing a curved/bent touch-screen panel according to example embodiments.
Figure 7B:
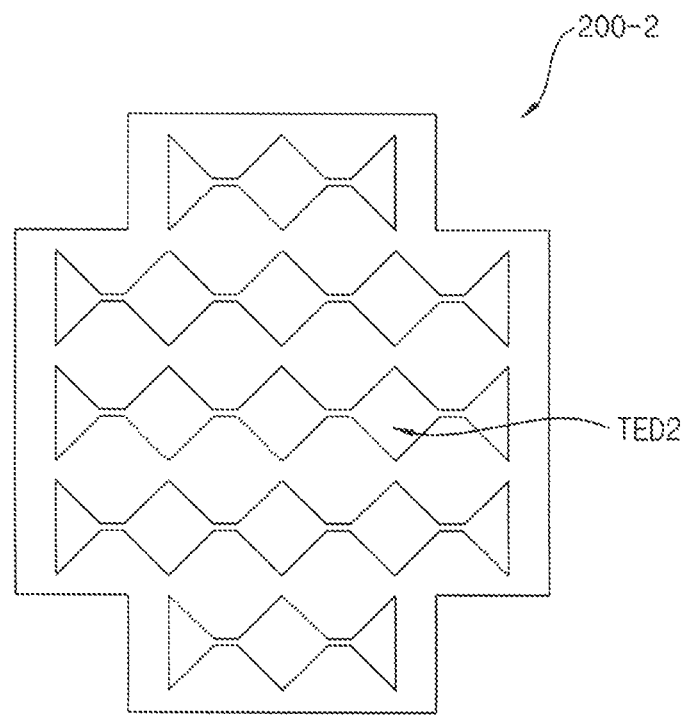

FIGS. 7A and 7B are diagrams illustrating transparent electrode layers of a panel (partially-removed panel or remaining panel) prepared for manufacturing a curved touch-screen panel according to example embodiments.

Referring to FIGS. 7A and 7B, the curved touch-screen panel 120 may include a first transparent electrode layer 200-1 having a structure in which first transparent electrode patterns TED1 are connected in a first direction (e.g., top and bottom direction) and may include a second transparent electrode layer 200-2 having a structure in which second transparent electrode patterns TED2 are connected in a second direction (e.g., left and right direction) that is perpendicular to the first direction. Specifically, the first transparent electrode layer 200-1 may overlap the second transparent electrode layer 200-2 in the curved touch-screen panel 120. The curved touch-screen panel 120 may sense a touch input applied on the curved touch-screen panel 120 based on capacitance changes between the first transparent electrode patterns TED1 connected in the first direction and the second transparent electrode patterns TED2 connected in the second direction. As illustrated in FIGS. 7A and 7B, a transparent electrode pattern of the center remaining region may be identical to a transparent electrode pattern of the outer remaining region in the curved touch-screen panel 120. In embodiments, the center remaining region of the curved touch-screen panel 120 may include three transparent electrode pattern lines, and each of the outer remaining regions of the curved touch-screen panel 120 may include one transparent electrode pattern line. In embodiments, since the transparent electrode pattern of the center remaining region is identical to the transparent electrode pattern of the outer remaining region in the curved touch-screen panel 120, an electrode pitch of the center remaining region may be equal to an electrode pitch of the outer remaining region in the curved touch-screen panel 120. In embodiments, it is required to prevent sensing errors from occurring in the center remaining region and the outer remaining regions of the curved touch-screen panel 120. Thus, a pitch design of the transparent electrode pattern (i.e., TED1 and TED2) may be performed to make the center remaining region and the outer remaining regions include a complete shaped transparent electrode pattern. Since a shape of the transparent electrode pattern (i.e., TED1 and TED2) illustrated in FIGS. 7A and 7B is an example, the shape of the transparent electrode pattern (i.e., TED1 and TED2) of the curved touch-screen panel 120 is not limited thereto.

Figure 8A:
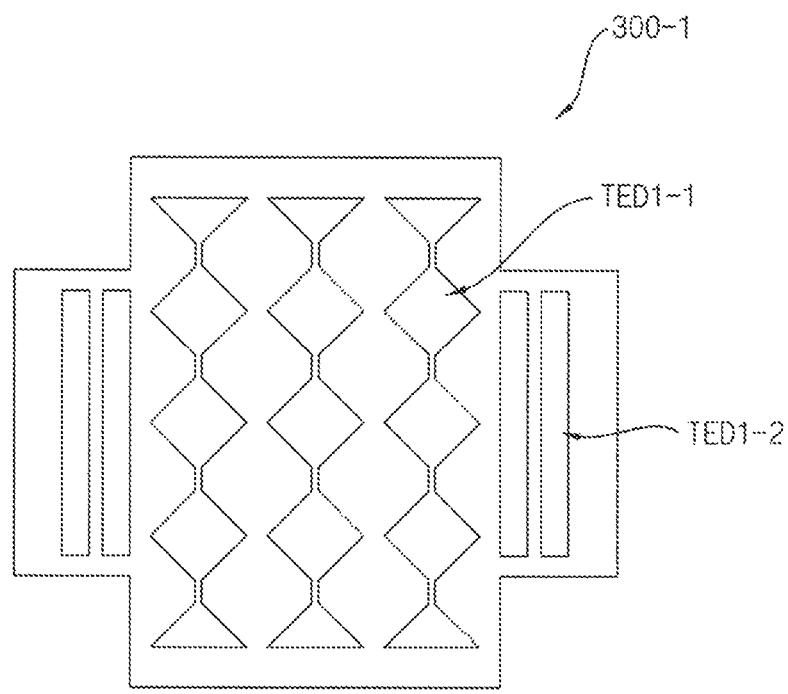
FIG. 8A and FIG. 8B are diagrams illustrating transparent electrode layers of a panel (partially-removed panel or remaining panel) prepared for manufacturing a curved/bent touch-screen panel according to example embodiments.
Figure 8B:
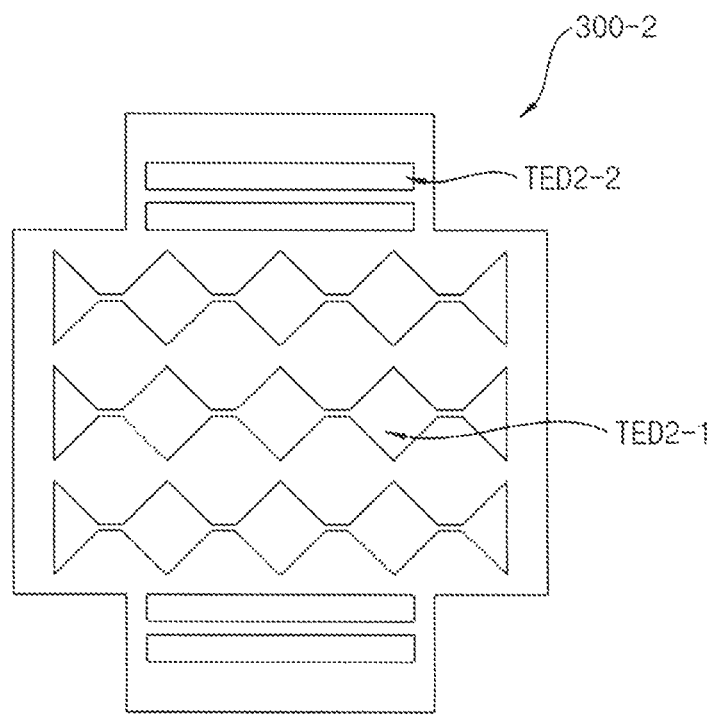

FIGS. 8A and 8B are diagrams illustrating transparent electrode layers of a panel (partially-removed panel or remaining panel) prepared for manufacturing a curved touch-screen panel according to example embodiments.

Referring to FIGS. 8A and 8B, the curved touch-screen panel 120 may include a first transparent electrode layer 300-1 having a structure in which first transparent electrode patterns TED1-1 and TED1-2 are connected in a first direction (e.g., top and bottom direction) and may include a second transparent electrode layer 300-2 having a structure in which second transparent electrode patterns TED2-1 and TED2-2 are connected in a second direction (e.g., left and right direction) that is perpendicular to the first direction. Specifically, the first transparent electrode layer 300-1 may overlap the second transparent electrode layer 300-2 in the curved touch-screen panel 120. The curved touch-screen panel 120 may sense a touch input applied on the curved touch-screen panel 120 based on capacitance changes between the first transparent electrode patterns TED1-1 and TED1-2 connected in the first direction and the second transparent electrode patterns TED2-1 and TED2-2 connected in the second direction. As illustrated in FIGS. 8A and 8B, a transparent electrode pattern of the center remaining region may be different from a transparent electrode pattern of the outer remaining region in the curved touch-screen panel 120. In embodiments, the transparent electrode patterns TED1-1 of the center remaining region may be different from the transparent electrode patterns TED1-2 of the outer remaining region in the first transparent electrode layer 300-1, and the transparent electrode patterns TED2-1 of the center remaining region may be different from the transparent electrode patterns TED2-2 of the outer remaining region in the second transparent electrode layer 300-2. In embodiments, the center remaining region of the curved touch-screen panel 120 may include three transparent electrode pattern lines, and each of the outer remaining regions of the curved touch-screen panel 120 may include two transparent electrode pattern lines. In embodiments, since the transparent electrode pattern of the center remaining region is different from the transparent electrode pattern of the outer remaining region in the curved touch-screen panel 120, an electrode pitch of the center remaining region may be unequal to an electrode pitch of the outer remaining region in the curved touch-screen panel 120. In some example embodiments, although the transparent electrode pattern of the center remaining region is different from the transparent electrode pattern of the outer remaining region in the curved touch-screen panel 120, the electrode pitch of the center remaining region may be equal to the electrode pitch of the outer remaining region in the curved touch-screen panel 120. In embodiments, it is required to prevent sensing errors from occurring in the center remaining region and the outer remaining regions of the curved touch-screen panel 120. Thus, a pitch design of the transparent electrode pattern (i.e., TED1-1, TED1-2, TED2-1, and TED2-2) may be performed to make the center remaining region and the outer remaining regions include a complete shaped transparent electrode pattern. Since a shape of the transparent electrode pattern (i.e., TED1-1, TED1-2, TED2-1, and TED2-2) illustrated in FIGS. 8A and 8B is an example, the shape of the transparent electrode pattern (i.e., TED1-1, TED1-2, TED2-1, and TED2-2) of the curved touch-screen panel 120 is not limited thereto.

Figure 9:
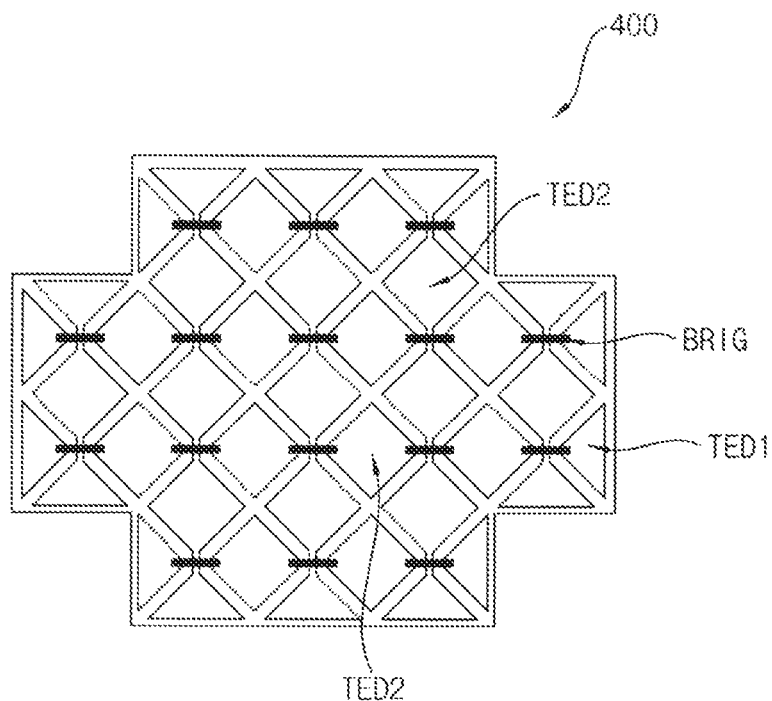
FIG. 9 is a diagram illustrating a transparent electrode layer of a panel (partially-removed panel or remaining panel) prepared for manufacturing a curved/bent touch-screen panel according to example embodiments.

FIG. 9 is a diagram illustrating a transparent electrode layer of a panel (partially-removed panel or remaining panel) prepared for manufacturing a curved touch-screen panel according to example embodiments.

Referring to FIG. 9, the curved touch-screen panel 120 may include a single transparent electrode layer 400 having a structure in which first transparent electrode patterns TED1 are connected in a first direction (e.g., top and bottom direction) and second transparent electrode patterns TED2 are connected using bridges BRIG in a second direction (e.g., left and right direction) that is perpendicular to the first direction. Specifically, the curved touch-screen panel 120 may sense a touch input applied on the curved touch-screen panel 120 based on capacitance changes between the first transparent electrode patterns TED1 connected in the first direction and the second transparent electrode patterns TED2 connected in the second direction. As illustrated in FIG. 9, a transparent electrode pattern of the center remaining region may be identical to a transparent electrode pattern of the outer remaining region in the curved touch-screen panel 120. In embodiments, the center remaining region of the curved touch-screen panel 120 may include three transparent electrode pattern lines extending in the first direction and two transparent electrode pattern lines extending in the second direction, and each of the outer remaining regions of the curved touch-screen panel 120 may include one transparent electrode pattern line. In embodiments, since the transparent electrode pattern of the center remaining region is identical to the transparent electrode pattern of the outer remaining region in the curved touch-screen panel 120, an electrode pitch of the center remaining region may be equal to an electrode pitch of the outer remaining region in the curved touch-screen panel 120. In embodiments, it is required to prevent sensing errors from occurring in the center remaining region and the outer remaining regions of the curved touch-screen panel 120. Thus, a pitch design of the transparent electrode pattern (i.e., TED1 and TED2) may be performed to make the center remaining region and the outer remaining regions include a complete shaped transparent electrode pattern. Since a shape of the transparent electrode pattern (i.e., TED1 and TED2) illustrated in FIG. 9 is an example, the shape of the transparent electrode pattern (i.e., TED1 and TED2) of the curved touch-screen panel 120 is not limited thereto.

Figure 10:
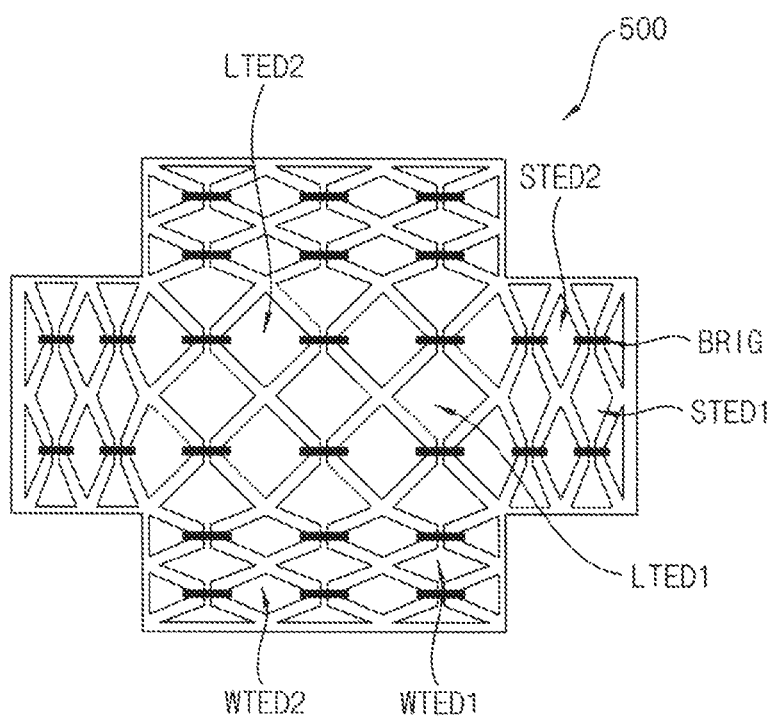
FIG. 10 is a diagram illustrating a transparent electrode layer of a panel (partially-removed panel or remaining panel) prepared for manufacturing a curved/bent touch-screen panel according to example embodiments.

FIG. 10 is a diagram illustrating a transparent electrode layer of a panel (partially-removed panel or remaining panel) prepared for manufacturing a curved touch-screen panel according to example embodiments.

Referring to FIG. 10, the curved touch-screen panel 120 may include a single transparent electrode layer 500 having a structure in which first transparent electrode patterns LTED1, STED1, and WTED1 are connected in a first direction (e.g., top and bottom direction) and second transparent electrode patterns LTED2, STED2, and WTED2 are connected using bridges BRIG in a second direction (e.g., left and right direction) that is perpendicular to the first direction. Specifically, the curved touch-screen panel 120 may sense a touch input applied on the curved touch-screen panel 120 based on capacitance changes between the first transparent electrode patterns LTED1, STED1, and WTED1 connected in the first direction and the second transparent electrode patterns LTED2, STED2, and WTED2 connected in the second direction. As illustrated in FIG. 10, a transparent electrode pattern of the center remaining region may be different from a transparent electrode pattern of the outer remaining region in the curved touch-screen panel 120. In embodiments, the transparent electrode patterns LTED1 and LTED2 of the center remaining region may be different from the transparent electrode patterns STED1 and STED2 of the outer remaining region in the single transparent electrode layer 500, and the transparent electrode patterns LTED1 and LTED2 of the center remaining region may be different from the transparent electrode patterns WTED1 and WTED2 of the outer remaining region in the single transparent electrode layer 500. In embodiments, the center remaining region of the curved touch-screen panel 120 may include three transparent electrode pattern lines extending in the first direction and two transparent electrode pattern lines extending in the second direction, and each of the outer remaining regions of the curved touch-screen panel 120 may include two transparent electrode pattern lines extending in the first direction and three transparent electrode pattern lines extending in the second direction or may include three transparent electrode pattern lines extending in the first direction and two transparent electrode pattern lines extending in the second direction. In embodiments, since the transparent electrode pattern of the center remaining region is different from the transparent electrode pattern of the outer remaining region in the curved touch-screen panel 120, an electrode pitch of the center remaining region may be unequal to an electrode pitch of the outer remaining region in the curved touch-screen panel 120. In some example embodiments, although the transparent electrode pattern of the center remaining region is different from the transparent electrode pattern of the outer remaining region in the curved touch-screen panel 120, the electrode pitch of the center remaining region may be equal to the electrode pitch of the outer remaining region in the curved touch-screen panel 120. In embodiments, it is required to prevent sensing errors from occurring in the center remaining region and the outer remaining regions of the curved touch-screen panel 120. Thus, a pitch design of the transparent electrode pattern (i.e., LTED1, LTED2, STED1, STED2, WTED1, and WTED2) may be performed to make the center remaining region and the outer remaining regions include a complete shaped transparent electrode pattern. Since a shape of the transparent electrode pattern (i.e., LTED1, LTED2, STED1, STED2, WTED1, and WTED2) illustrated in FIG. 10 is an example, the shape of the transparent electrode pattern (i.e., LTED1, LTED2, STED1, STED2, WTED1, and WTED2) of the curved touch-screen panel 120 is not limited thereto.

Figure 11:
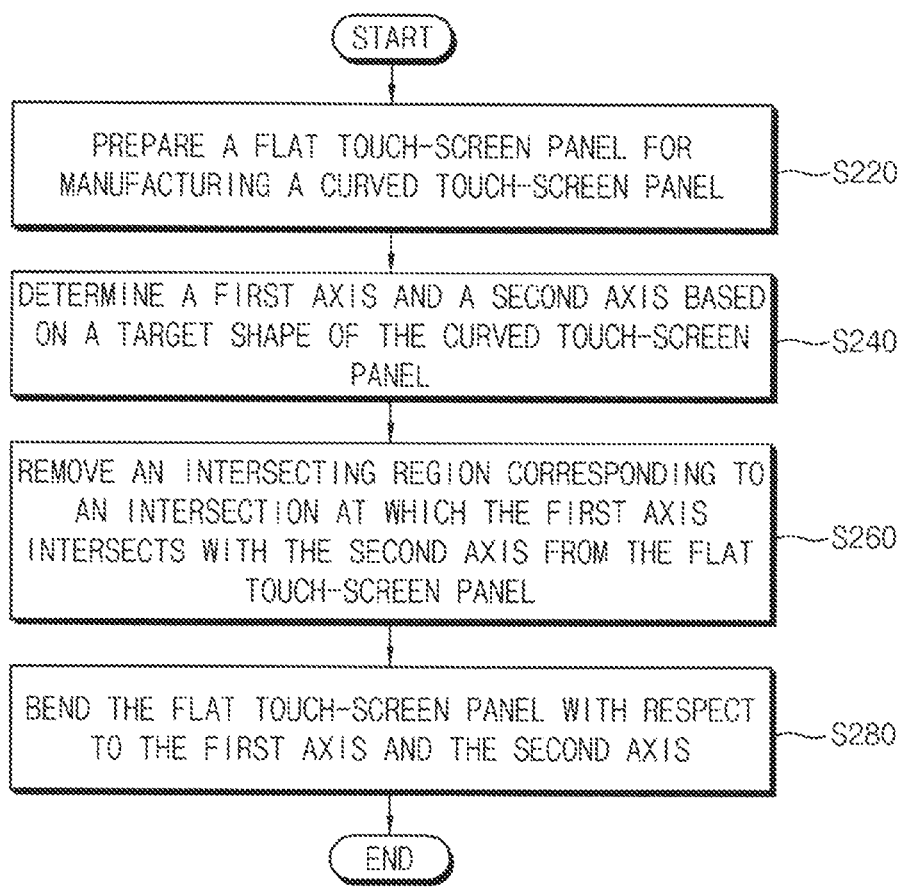
FIG. 11 is a flowchart illustrating a method of manufacturing a curved/bent touch-screen panel according to example embodiments.

FIG. 11 is a flowchart illustrating a method of manufacturing a curved touch-screen panel according to example embodiments.

Referring to FIG. 11, the method of manufacture a curved touch-screen panel may include the following steps: preparing a flat touch-screen panel (S220), determining a first axis and a second axis that intersects with the first axis based on a target shape of the curved touch-screen panel (S240), removing an intersecting region that includes an intersection at which the first axis intersects with the second axis or that is located near the intersection from the flat touch-screen panel (S260), and bending the flat touch-screen panel with respect to the first axis and the second axis to form the target shape of the curved touch-screen panel (S280). In an example embodiment, the intersecting region may include both a portion of the first axis and a portion of the second axis. In an example embodiment, the intersecting region may include either a portion of the first axis or a portion of the second axis. In an example embodiment, the intersecting region may include no portion of the first axis and no portion of the second axis. In an example embodiment, the flat touch-screen panel prepared for manufacturing the curved touch-screen panel may include a first transparent electrode layer having a structure in which first transparent electrode patterns are connected in a first direction and a second transparent electrode layer having a structure in which second transparent electrode patterns are connected in a second direction that is perpendicular to the first direction. In an example embodiment, the flat touch-screen panel prepared for manufacturing the curved touch-screen panel may include a single transparent electrode layer having a structure in which first transparent electrode patterns are connected in a first direction and second transparent electrode patterns are connected using bridges in a second direction that is perpendicular to the first direction. Since example embodiments are described above, duplicated description related thereto will not be repeated. Although an electronic device and a method of manufacturing a curved touch-screen panel according to example embodiments are described with reference to FIGS. 1 through 11, possible embodiments are not limited to the described embodiments. Those skilled in the art will readily appreciate that many modifications are possible in the example embodiments.

Embodiments may be applied to a touch-screen panel and an electronic device (e.g., a mobile device) including the touch-screen panel. For example, embodiments may be applied to one or more of a cellular phone, a smart phone, a video phone, a smart pad, a smart watch, a tablet PC, a car navigation system, a television, a computer monitor, a laptop, a head mounted display device, etc.

Although a few example embodiments have been described, those skilled in the art will readily appreciate that many modifications are possible in the example embodiments. All such modifications are intended to be included within the scope defined in the claims.

What is claimed is:

1. An electronic device comprising:
   a curved touch-screen panel having a shape bent with respect to a first axis and bent with respect to a second axis that intersects with the first axis, the curved touch-screen panel comprising an intersection at which the first axis intersects with the second axis, wherein the intersection is spaced from vertices of a removal region before the removal region is removed from the curved touch-screen panel; and
   a body to which the curved touch-screen panel is attached.

2. The electronic device of claim 1, wherein the curved touch-screen panel is divided into a center remaining region and an outer remaining region by the first axis and the second axis, and a transparent electrode pattern of the center remaining region is identical to a transparent electrode pattern of the outer remaining region.

3. The electronic device of claim 2, wherein the center remaining region includes N transparent electrode pattern lines, where N is an integer greater than or equal to 1, and the outer remaining region includes M transparent electrode pattern lines, where M is an integer greater than or equal to 1.

4. The electronic device of claim 3, wherein an electrode pitch of the center remaining region is the same as an electrode pitch of the outer remaining region.

5. The electronic device of claim 1, wherein the curved touch-screen panel is divided into a center remaining region and an outer remaining region by the first axis and the second axis, and a transparent electrode pattern of the center remaining region is different from a transparent electrode pattern of the outer remaining region.

6. The electronic device of claim 5, wherein the center remaining region includes N transparent electrode pattern lines, where N is an integer greater than or equal to 1, and the outer remaining region includes M transparent electrode pattern lines, where M is an integer greater than or equal to 1.

7. The electronic device of claim 6, wherein an electrode pitch of the center remaining region is the same as an electrode pitch of the outer remaining region.

8. The electronic device of claim 6, wherein an electrode pitch of the center remaining region is different from an electrode pitch of the outer remaining region.

9. The electronic device of claim 1, wherein the curved touch-screen panel includes a first transparent electrode layer having a structure in which first transparent electrode patterns are connected in a first direction and a second transparent electrode layer having a structure in which second transparent electrode patterns are connected in a second direction that is perpendicular to the first direction.

10. The electronic device of claim 1, wherein the curved touch-screen panel includes a single transparent electrode layer having a structure in which first transparent electrode patterns are connected in a first direction and second transparent electrode patterns are connected using bridges in a second direction that is perpendicular to the first direction.

11. The electronic device of claim 1, further comprising:
    a curved display panel combined with the curved touch-screen panel, the curved display panel being manufactured to have a shape that is substantially identical to the shape of the curved touch-screen panel.

12. A method of manufacturing a curved touch-screen panel comprising:
    preparing a flat touch-screen panel;
    determining a first axis and a second axis that intersects with the first axis based on a target shape of a curved touch-screen panel;
    removing a removal region, wherein vertices of the removal region is spaced from an intersection at which the first axis intersects with the second axis before the removing; and
    bending the flat touch-screen panel with respect to the first axis and the second axis to form the target shape of the curved touch-screen panel.

* * * * *